(12) United States Patent
Kimura

(10) Patent No.: US 9,013,599 B2
(45) Date of Patent: Apr. 21, 2015

(54) IMAGE PICK-UP AND AUDIO SIGNAL PROCESSING APPARATUS AND METHOD FOR CONTROLLING AN IMAGE PICK-UP AND AUDIO SIGNAL PROCESSING APPARATUS

(75) Inventor: Masafumi Kimura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 201 days.

(21) Appl. No.: 13/299,536

(22) Filed: Nov. 18, 2011

(65) Prior Publication Data

US 2012/0140103 A1    Jun. 7, 2012

(30) Foreign Application Priority Data

Dec. 1, 2010   (JP) ................................ 2010-268746

(51) Int. Cl.
*H04N 5/76* (2006.01)
*G01L 21/02* (2006.01)

(52) U.S. Cl.
CPC ...................................... *G01L 21/02* (2013.01)

(58) Field of Classification Search
CPC ................. H04N 1/2112–1/2154; H04N 5/77; H04N 5/772; G10L 21/02; G11B 31/006
USPC ............... 348/207.99, 208.99–208.16, 231.4, 348/240.99–240.3, 241; 704/233
See application file for complete search history.

(56) References Cited

U.S. PATENT DOCUMENTS

2006/0265218 A1* 11/2006 Samadani ...................... 704/233
2010/0157102 A1*  6/2010 Kurokawa .................. 348/240.1
2011/0234848 A1*  9/2011 Matsumoto et al. ....... 348/231.4

FOREIGN PATENT DOCUMENTS

| JP | 2004-088166 A | 3/2004 |
| JP | 2006-229401 A | 8/2006 |
| JP | 2006-270591 A | 10/2006 |
| JP | 2007-329689 A | 12/2007 |
| JP | 2008-113109 A | 5/2008 |
| JP | 2012-054751 A | 3/2012 |

* cited by examiner

*Primary Examiner* — Dennis Hogue
(74) *Attorney, Agent, or Firm* — Canon USA Inc. IP Division

(57) ABSTRACT

A controller controls a first changing unit to intermittently drive an optical unit of an image pick-up unit, and while the image pick-up parameter is being changed, reduces the noise based on an audio signal obtained by a microphone unit in a period before or after a period the optical unit is being driven.

6 Claims, 6 Drawing Sheets

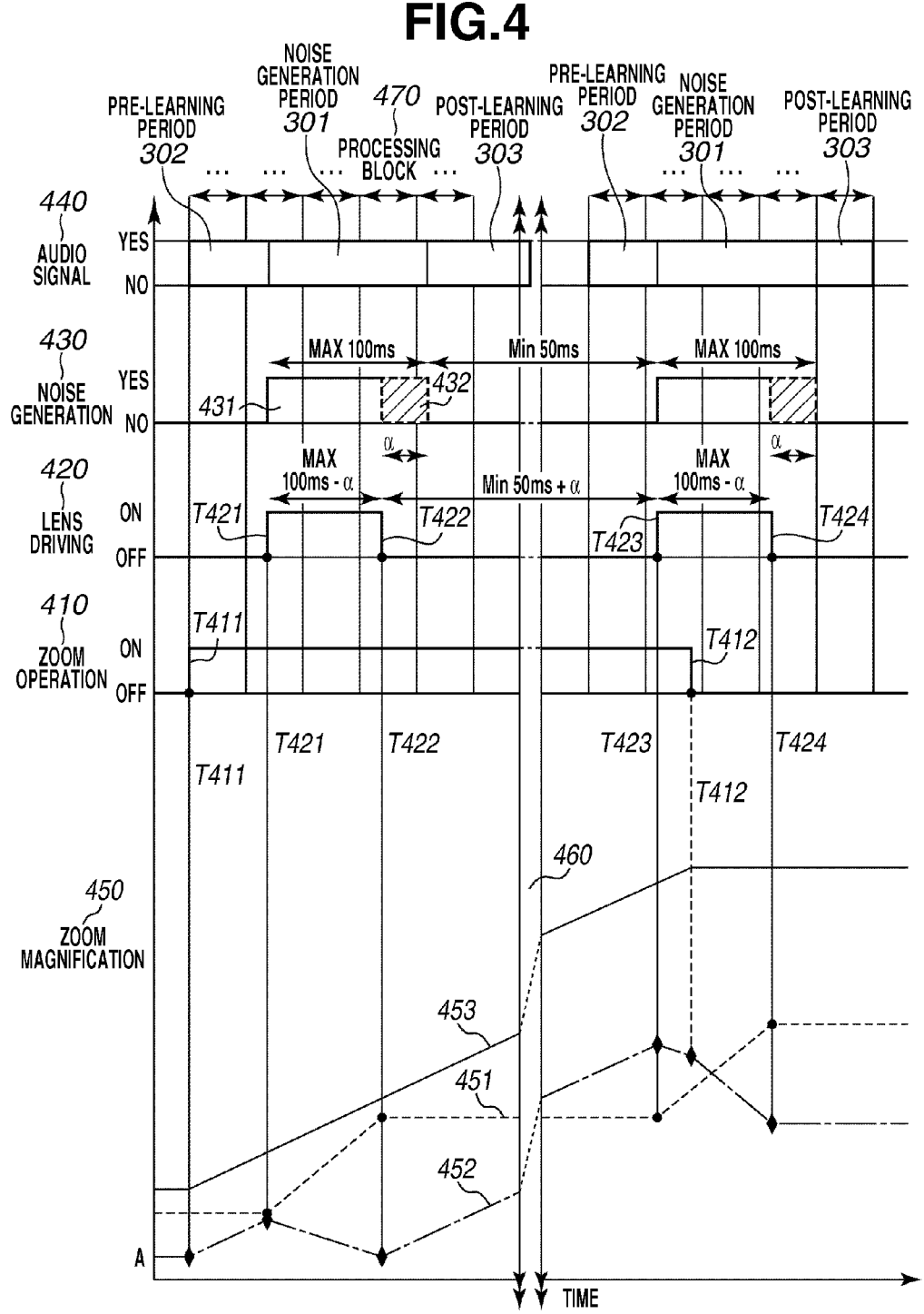

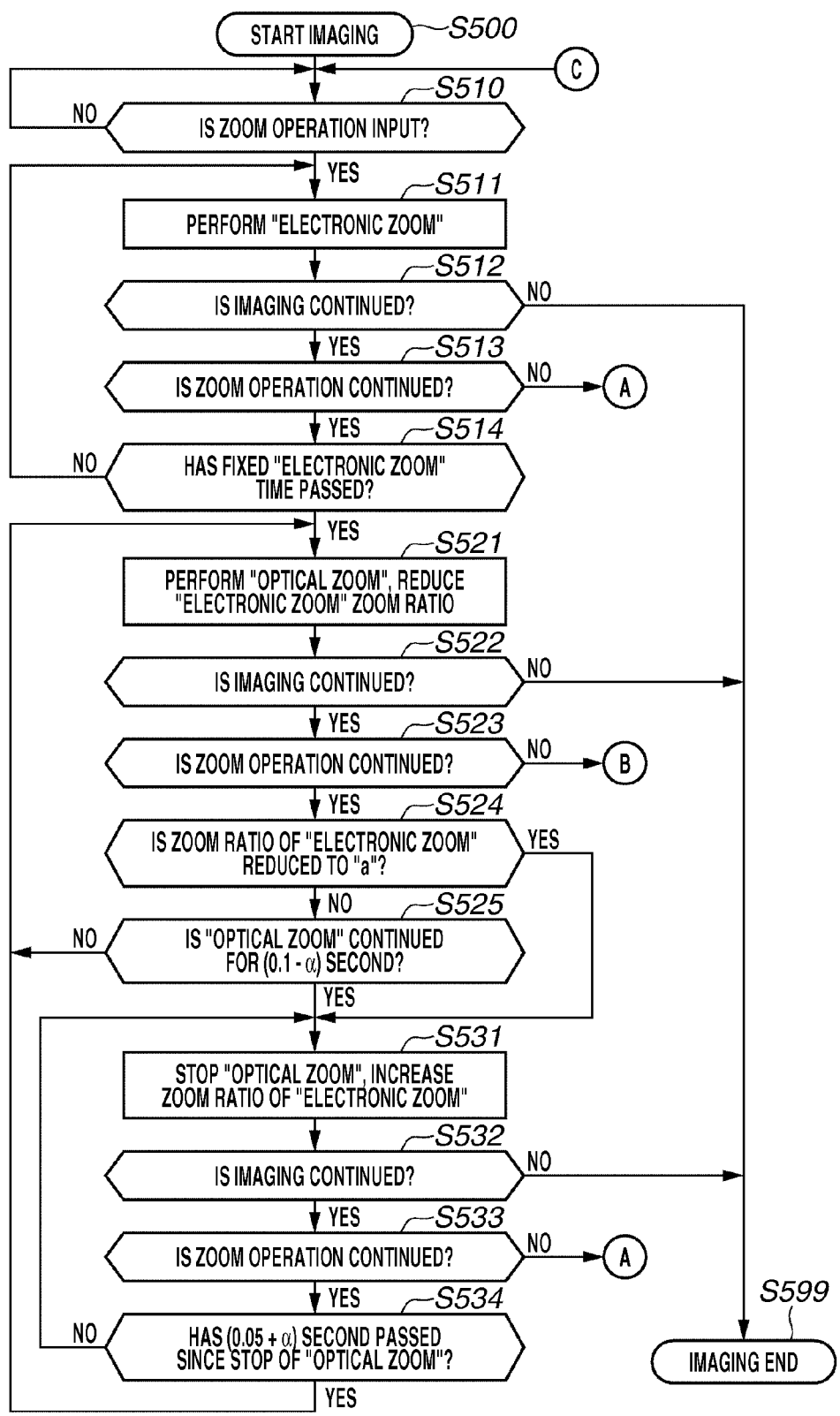

IMAGE PICK-UP AND AUDIO SIGNAL PROCESSING APPARATUS AND METHOD FOR CONTROLLING AN IMAGE PICK-UP AND AUDIO SIGNAL PROCESSING APPARATUS

BACKGROUND OF THE INVENTION

1. Field of the Invention

The present invention relates to an image pick-up apparatus and an information processing system.

2. Description of the Related Art

Conventionally, image pick-up apparatuses have functions of processing an audio signal acquired via a built-in microphone or an external microphone, and recording the processed signal or transmitting the processed signal to an external device. These image pick-up apparatuses record audio data together with moving image data in a recording medium. These image pick-up apparatuses include a zoom lens, a focus lens, and also a diaphragm. When the lenses are moved and the diaphragm is opened/closed or when the lenses are moved so as to prevent image from blurring by the drive of the drive unit, in some cases, a noise due to the drive has been generated. In other words, the drive noise caused by the drive of the apparatus is collected by a microphone and recorded together with the audio signals. Thus, when a user reproduces a moving image, the noise makes the reproduced audio sound in the environment at the time of recording hard to hear.

Regarding such an issue, for example, Japanese Patent Application Laid-Open No. 2007-329689 discusses a technique useful for an image pick-up apparatus including an optical zoom function and an electronic zoom function. According to this technique, when a user performs the zoom operation, high speed zooming is realized while suppressing the noise associated with the optical zoom by performing low speed operation of the optical zoom function together with the electronic zoom function. The optical zoom function is a function of optically zooming on an image by moving the zoom lens. The electronic zoom function is a function of zooming on an image by clopping a portion of the captured image, and recording and displaying it. According to the technique discussed in Japanese Patent Application Laid-Open No. 2007-329689, the optical zoom function is moved at a low speed to move the zoom lens slowly, so that the noise (drive noise) is controlled. However, since the zooming also becomes slow, the electronic zoom function has been used so as to compensate the optical zoom function.

However, according to Japanese Patent Application Laid-Open No. 2007-329689, even if the optical zoom function is operated at a low speed, in some cases, the noise of the optical zoom operated at a low speed is recorded, and the noise (drive noise) has not been reduced to a satisfactory extent.

SUMMARY OF THE INVENTION

The present invention is directed to an image pick-up apparatus or an information processing system that drives an optical system and performs image signal processing so that an obtained image signal is changed at a substantially fixed ratio in response to an image change (e.g., enlargement) instruction, and is capable of reducing a noise generated by a drive of the optical system in an effective manner.

According to an aspect of the present invention, an image pick-up apparatus includes an image pick-up unit, a first changing unit configured to change an image pick-up parameter by driving an optical unit of the image pick-up unit, a second changing unit configured to change the image pick-up parameter by processing an image obtained by the image pick-up unit, a microphone unit, an audio processing unit configured to reduce a noise included in an audio signal obtained by the microphone unit, wherein the noise is generated by driving of the optical unit of the image pick-up unit, a recording unit configured to record an audio signal processed by the audio processing unit on a recording medium, and a controller configured to control the first changing unit, the second changing unit, and the audio processing unit, wherein the controller controls both the first changing unit and the second changing unit to change the image pick-up parameter, wherein the controller controls the first changing unit to intermittently drive the optical unit while the image pick-up parameter is being changed, and wherein the controller controls the audio processing unit to reduce the noise based on the audio signal obtained by the microphone unit in a period before or after a period in which the optical unit is being driven.

According to the present invention, a noise which is generated due to an operation of the drive unit associated with an image pick-up operation of the image pick-up apparatus can be reduced in an effective manner.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a relationship between an enlargement operation, an enlargement ratio, a lens drive period, and a noise generation period when recording is performed.

FIG. 5 is a flowchart illustrating processing of the image pick-up apparatus which is performed when the enlargement operation is performed during the recording operation.

DESCRIPTION OF THE EMBODIMENTS

Various exemplary embodiments, features, and aspects of the invention will be described in detail below with reference to the drawings.

According to a first exemplary embodiment, an image pick-up apparatus including drive units such as a lens drive unit and a diaphragm mechanism will be employed as the image pick-up apparatus in the description.

Especially, according to the present exemplary embodiment, an image pick-up apparatus that intermittently performs the optical zoom and reduces the noise generated according to the drive by using an audio signal in the time period during which the optical zoom is not performed will be employed in the description. According to the present exemplary embodiment, smooth zooming of the video is achieved by intermittent operation of the optical zoom and adjustment of the zoom ratio of the electronic zoom. Although a combination of the optical zoom and the electronic zoom is described below, any type of zoom can be used so long as a combination of an optical changing operation and an electronic changing operation can be performed. For example, if the operation is focusing operation, smooth focus adjustment of the video can be achieved by performing electronic processing of the image in addition to executing intermittent optical focusing. Additionally, optical image stabilization and electronic image stabilization can be combined, and open and close operations of a diaphragm and electronic brightness correction or blurring processing can be combined.

Figure 1:
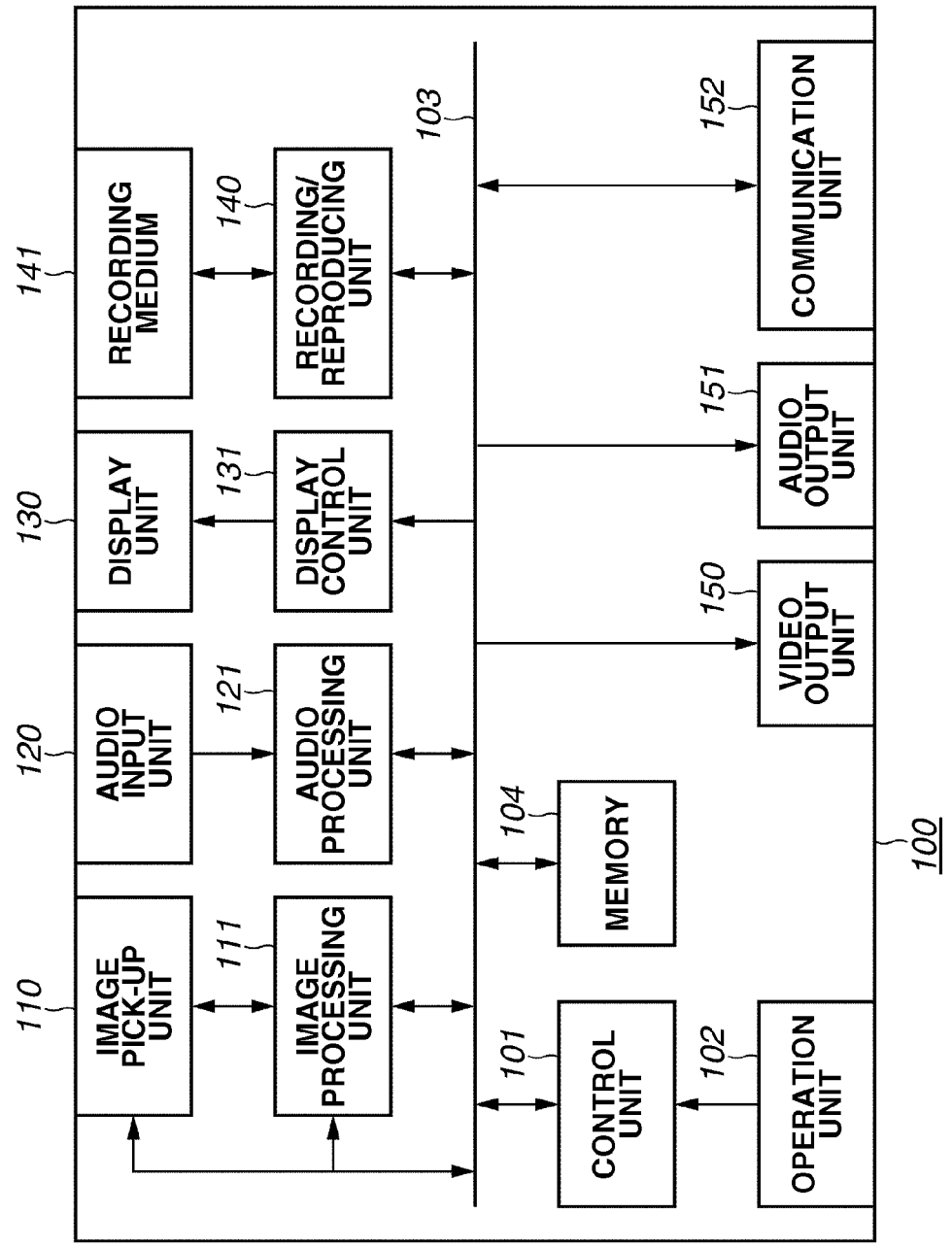
FIG. 1 is a block diagram illustrating an image pick-up apparatus.

FIG. 1 is a block diagram illustrating a configuration of an image pick-up apparatus 100 according to the first exemplary embodiment. In FIG. 1, a control unit 101 includes a central processing unit (CPU) (micro-processing unit (MPU)) and a memory (dynamic random access memory (DRAM), static RAM (SRAM), or the like). The control unit 101 executes various types of processing (programs) to controls each block in the image pick-up apparatus 100 and controls data transfer between the blocks. The control unit 101 can also be a microcomputer including a CPU and a memory. An operation unit 102 receives an operation by a user and outputs an operation signal. The control unit 101 receives such an operation signal and controls each block of the image pick-up apparatus 100 according to the received operation signal. Further, the control unit 101 analyzes an image obtained from an image processing unit 111 described below, and controls each block of the image pick-up apparatus 100 according to the result of the analysis.

The operation unit 102 includes switches and the like for inputting various imaging-related operations. The switches are, for example, a power supply button, a recording start button, a zoom adjustment button, and an autofocus button. Further, the operation unit 102 includes a menu display button, an enter button, cursor keys, a pointing device, and a touch panel. When the user operates the keys or the buttons, the operation unit 102 transmits an operation signal to the control unit 101.

A bus 103 is a general purpose bus used for transmitting various types of data, control signals, and instruction signals to each block of the image pick-up apparatus 100.

When an optical image of an object is captured via a lens, an image pick-up unit 110 controls a light quantity by a diaphragm and converts the image into an image signal by an image sensor such as a charge-coupled device (CCD) sensor or a complementary metal oxide semiconductor (CMOS) sensor. Then, the image pick-up unit 110 performs analog-to-digital conversion on the image signal and transmits the obtained signal to the image processing unit 111.

The image processing unit 111 executes processing necessary for the recording and reproduction of the image. The image processing unit 111 can be either a microcomputer including a program that executes the processing described below or a functional portion of the control unit 101 that executes the function described below. The image processing unit 111 includes a chip set that performs image quality adjustment processing on the digital image signal acquired from the image processing unit 110 for adjusting a white balance, color, and brightness based on setting values. The image signal processed by the image processing unit 111 is transmitted to a memory 104, a video output unit 150, or a display control unit 131, which are described below, by the control unit 101. The image processing unit 111 generates uncompressed still image data and uncompressed moving image data from the digital image signal acquired from the image pick-up unit 110. Further, the image processing unit 111 can generate still image data and moving image data obtained by compressing and coding of an image of one frame, and also generate moving image data obtained by inter-frame coding of a plurality of frames.

According to the present exemplary embodiment, the image pick-up unit 110 includes an "optical zoom" function and an "optical image stabilization" function. Further, the image processing unit 111 includes an "electronic zoom" function and an "electronic image stabilization" function. The "optical zoom" function and the "electronic zoom" function are a function of enlarging the obtained image according to the user's operation. Further, the "optical image stabilization" function and the "electronic image stabilization" function are a function of preventing image from vibrating due to vibration of the main body of the image pick-up apparatus 100. These functions can be simultaneously or alternately used by the control unit 101. Further, one of such functions can be individually used by the control unit 101.

The "optical zoom" function is a function of moving the lens of the image pick-up unit 110 according to the user's operation of a zoom key of the operation unit 102, and enlarging or reducing a size of an optical image of an object to be captured. In other words, the "optical zoom" is a function of optically correcting a size parameter of the obtained image signal. The "electronic zoom" function is a function of causing the image processing unit 111 to generate an image signal of an enlarged image of an image obtained by clipping of a portion of an image acquired by the image pick-up unit 110 according to the user's operation of the zoom key of the operation unit 102. In other words, the "electronic zoom" is a function of electronically correcting a size parameter of the obtained image signal.

The "optical image stabilization" function is a function of calculating a movement amount of an image stabilizing lens based on a value of an acceleration signal transmitted from a vibration detection unit (not illustrated) and moving the image stabilizing lens according to the obtained movement amount, so that vibration of the acquired image can be prevented. The "electronic image stabilization" is a function of adjusting a position of the image signal acquired by the image pick-up unit 110 based on a value of an acceleration signal transmitted from the vibration detection unit (not illustrated), so that vibration of the acquired image can be prevented. Since these functions are based on publicly known techniques, detailed descriptions are not provided.

The image pick-up apparatus 100 according to the present exemplary embodiment can realize focus functions by both optical processing and electronic processing in addition to the above-described zoom function and the image stabilization function. Since a lens or a diaphragm is moved in the optical processing, a noise (drive noise) is generated. The image pick-up apparatus 100 according to the present exemplary embodiment can change one parameter concerning the image enlargement by using both the optical correction (correction by the drive of the optical system) and the electronic correction (correction by the image processing).

Since the "optical zoom" function is associated with physical lens movement, a noise is generated from the drive unit and a unit driven by the drive unit when the "optical zoom" function is operated. According to the present exemplary embodiment, however, such a noise can be reduced according to "noise reduction processing" described below.

An audio input unit 120 collects sounds around the image pick-up apparatus 100 by, for example, a built-in non-directional microphone or an external microphone connected via an audio input terminal. The acquired analog audio signal is converted into a digital signal and transmitted to an audio processing unit 121.

The audio processing unit 121 executes processing necessary in recording and reproducing the audio signals. The audio processing unit 121 can be either a microcomputer including a program that executes the processing described below or a functional portion of the control unit 101 that executes the function described below.

The audio processing unit 121 performs level adjustment processing of the digital audio signal acquired from the audio input unit and also performs processing associated with audio such as the "noise reduction processing". The audio signal processed by the audio processing unit 121 is transmitted to the memory 104 or an audio output unit 151 by the control unit 101 described below. The audio processing unit 121 outputs the digital audio signal acquired from the audio input unit 120 as uncompressed audio data or compressed audio data processed by a known audio compression technique such as Advanced Audio Coding (AAC) or Audio Code Number 3 (AC3).

The memory 104 temporarily stores the still image data, moving image data, or audio data obtained via the image processing unit 111 or the audio processing unit 121.

The control unit 101 reads out, for example, the still image data from the memory 104 and transfers the data to a recording/reproducing unit 140. The recording/reproducing unit 140 records the transferred still image data in a recording medium 141. Further, the control unit 101 can perform camera setting which is used for the image capturing, generate various detection-related data pieces, and record such settings and data pieces together with the still image data, moving image data, or audio data in the recording medium 141.

The recording medium 141 can be a built-in recording medium of the image pick-up apparatus or a removable recording medium, so long as a compressed image signal, a compressed audio signal, an audio signal, or various types of data pieces generated by the image pick-up apparatus 100 can be recorded. For example, the recording medium 141 can be a recording medium such as a hard disk, an optical disk, a magneto-optical disk, a compact disc-recordable (CD-R), a digital versatile disc recordable (DVD-R), a magnetic tape, a non-volatile semiconductor memory, a flash memory, or the like. The recording/reproducing unit 140 records still image data as a still image file and moving image data and audio data as one moving image file in the recording medium 141.

The recording/reproducing unit 140 reads out (reproduces) not only the still image file or the moving image file recorded in the recording medium 141 but also various information data pieces and programs recorded aside from the still image file and the moving image file. When, for example, the control unit 101 transfers still image data included in the read still image file to the image processing unit 111, the image processing unit 111 reproduces the image of the still image data. The control unit 101 then transfers the reproduced image to the display control unit 131.

The display control unit 131 controls the display unit 130 to display the transferred image thereon. Further, the control unit 101 transfers the moving image data included in the read moving image file to the image processing unit 111 as well as transfers the audio data thereof to the audio processing unit 121. The image processing unit 111 sequentially reproduces frame images of the transferred moving image data. Then, as is the case with the reproduction processing of the still image, the control unit 101 sequentially transfers the frame images to the display control unit 131 so that the image is displayed on the display unit 130.

On the other hand, the audio processing unit 121 sequentially reproduces the transferred audio data and generates an audio signal. Further, according to the control of the control unit 101, the audio processing unit 121 transfers the reproduced audio signal to the audio output unit 151. The audio output unit 151 includes, for example, an audio output terminal that externally outputs audio signals in analog or digital form. Thus, the audio output unit 151 can output sound from a connected earphone or a speaker.

The image reproduced by the image processing unit 111 can be output to an external display device via the video output unit 150. The video output unit 150 includes, for example, a video output terminal and transmits an image signal to the external display device connected to the image pick-up apparatus so that the video image can be displayed on the display device. The audio output unit 151 and the video output unit 150 can be an integrated terminal such as a High-Definition Multimedia Interface (HDMI) (registered trademark) terminal.

The display control unit 131 controls the display unit 130 so that the moving image or the still image transmitted from the image processing unit 111 or an operation screen (menu screen) which is used for operating the image pick-up apparatus 100 is displayed on the display unit 130. The display unit 130 is a display device such as a liquid crystal display, an organic light-emitting diode (OLED) display, or an electronic paper.

A communication unit 152 is used for communication between the image pick-up apparatus 100 and an external apparatus. The communication unit 152 transmits and receives various types of data such as still image data, moving image data, and audio data to and from the external apparatuses. Further, the communication unit 152 transmits and receives commands such as an imaging start command and an imaging end command, imaging control signals, and other information pieces to and from the external apparatuses. The communication unit 152 is a wireless communication module such as an infrared communication module, Bluetooth (registered trademark) communication module, a wireless local area network (LAN) communication module, or a wireless universal serial bus (USB).

Next, a normal operation of the image pick-up apparatus 100 according to the present exemplary embodiment will be described.

When the user operates the power supply button of the operation unit 102 of the image pick-up apparatus 100 according to the present exemplary embodiment, a start instruction is output from the operation unit 102 to the control unit 101. On receiving the instruction, the control unit 101 controls a power supply unit (not illustrated) to supply power to each block of the image pick-up apparatus 100.

After the power is supplied, the control unit 101 determines which mode is selected by the mode change switch of the operation unit 102 according to an instruction signal transferred from the operation unit 102. The mode is, for example, a moving image capturing mode, a still image capturing mode, a reproduction mode, or the like.

Regarding the moving image capturing mode, if the user operates the recording start button of the operation unit 102 of the apparatus which is in the imaging standby state, the imaging is started and the moving image data and the audio data is generated. The generated data pieces are sequentially recorded in the recording medium 141. If the user operates an imaging stop button of the operation unit 102, the apparatus stops the imaging and returns to the imaging standby state again. Regarding the still image capturing mode, if the user operates a shutter button of the operation unit 102 of the apparatus which is in the imaging standby state, the imaging is started and a still image is generated. The generated still image data is recorded in the recording medium 141. Regarding the reproduction mode, an image signal and an audio signal of a file selected by the user are reproduced from the recording medium 141. The reproduced audio signal is output from the audio output unit 151 and a video image relating to the reproduced image signal is displayed on the display unit 130.

The moving image capturing mode will be described in detail. As described above, when the moving image capturing mode is set by the operation unit 102, the control unit 101 sets each block of the image pick-up apparatus 100 in the imaging standby state. If an imaging start instruction signal is transmitted from the operation unit 102 according to the user's operation of the recording start button of the operation unit 102 during the imaging standby state, the control unit 101 transmits an imaging start control signal to each block of the image pick-up apparatus 100 so that the operation described below is started.

The image pick-up unit 110 controls the light quantity of the optical image of the object captured by the lens by the diaphragm, converts the optical image into an image signal by the image sensor, performs analog-to-digital conversion of the image signal, and transmits the acquired image signal to the image processing unit 111. The image processing unit 111 performs image quality adjustment processing (e.g., white balance, color, brightness adjustment, etc.) of the acquired digital image signal based on a setting value, and generates moving image data using the acquired plurality of digital image signals.

Further, the digital image signal is transmitted to the display control unit 131 from the control unit 101, and the generated moving image data is transmitted to the memory 104. The display control unit 131 displays the video image relating to the received image signal on the display unit 130. Based on the image signal or an instruction transferred from the operation unit 102, the control unit 101 transmits a lens control signal used for operating a lens group (not illustrated) or a diaphragm of the image pick-up unit 110 to the image pick-up unit 110.

The audio input unit 120 performs analog-to-digital conversion on the analog audio signal obtained via the microphone and transmits the acquired digital audio signal to the audio processing unit 121. The audio processing unit 121 performs processing such as the level adjustment processing on the acquired digital audio signal and the "noise reduction processing" described below, and generates audio data. The control unit 101 transfers the digital audio signal processed by the audio processing unit 121 to the audio output unit 151 and transmits the generated audio data to the memory 104.

Then, the control unit 101 sequentially outputs the moving image data and the audio data temporarily stored in the memory 104 to the recording/reproducing unit 140. The recording/reproducing unit 140 writes one moving image file including the moving image data and the audio data in the recording medium 141 based on a file system management such as universal disk format (UDF), a file allocation table (FAT), or the like.

The above-described operation is continued while the imaging is performed.

While the imaging is performed, the control unit 101 transmits various control signals to the image pick-up unit 110, the image processing unit 111, or the audio processing unit 121 according to a result of an analysis of the image signal generated according to the user's operation of the operation unit 102 or by the image processing unit 111. For example, the control unit 101 transmits a control signal used for lens movement or diaphragm adjustment to the image pick-up unit 110, transmits a control signal used for image adjustment to the image processing unit 111, and transmits a control signal used for performing the "noise reduction processing" to the audio processing unit 121.

Similarly, while the imaging is performed, if the user operates the zoom key of the operation unit 102, the control unit 101 operates the "optical zoom" function of the image pick-up unit 110 or the "electronic zoom" function of the image processing unit 111. If an acceleration signal is detected by the vibration detection unit (not illustrated), the control unit 101 operates the "optical image stabilization" function of the image pick-up unit 110 or the "electronic image stabilization" function of the image processing unit 111. In this case, the control unit 101 transmits a control signal for causing the audio processing unit 121 to perform the "noise reduction processing" at the timing the function, such as the "optical zoom" function or the "optical image stabilization" function that generates noise, starts to operate.

When the user operates a record button of the operation unit 102, an imaging end instruction signal is transmitted to the control unit 101. Then, the control unit 101 transmits the imaging end control signal to each block of the image pick-up apparatus 100, and the operation described below is started.

First, the image processing unit 111 and the audio processing unit 121 stop the respective operations to generate the moving image data from the acquired image signal and the audio data from the acquired audio signal. Then, after transmitting the last moving image data and audio data which have been generated to the memory 104, the control unit 101 stops the transmission of the data. The control unit 101 continues the transfer of the data until the last moving image data and audio data are transferred to the recording/reproducing unit 140. When the recording/reproducing unit 140 completes the one moving image file based on the file system management, such as UDF or FAT, the recording operation is stopped.

When the recording operation is stopped, the control unit 101 transmits a control signal to each block of the image pick-up apparatus 100 to shift to the imaging standby state. Then the apparatus returns to the imaging standby state.

If the apparatus is in the imaging standby state, the control unit 101 controls each block of the image pick-up apparatus 100 to perform the operation described below.

The image processing unit 111 transmits an image signal to the display control unit 131 and a video image relating to the image signal is displayed on the display unit 130. The user can prepare for the next imaging while viewing the image displayed in this manner.

The control unit 101 transmits the audio signal obtained from the audio processing unit 121 to the audio output unit 151 so that the sound is output from the built-in speaker or a speaker or an earphone connected to the apparatus. The user can adjust the manual volume for determining the recording volume of the operation unit 102 while listening to the sound output in this manner.

According to the present exemplary embodiment, although the sound is recorded together with an image, only sound can be recorded by an operation similar to the operation described above.

Next, the still image capturing mode will be described in detail. As described above, when the still image capturing mode is set by the operation unit 102, the control unit 101 sets each block of the image pick-up apparatus 100 in the imaging standby state. If a still image recording instruction signal is transmitted from the operation unit 102 according to the user's operation of the shutter button of the operation unit 102 when the apparatus is in the imaging standby state, the control unit 101 transmits a still image capturing control signal to each block of the image pick-up apparatus 100 so that the operation described below is started.

The image pick-up unit 110 controls the light quantity of the optical image of the object captured by the lens by the diaphragm, converts the optical image into an image signal by the image sensor, performs analog-to-digital conversion of the image signal, and transmits the acquired image signal to the image processing unit 111. The image processing unit 111 performs image quality adjustment processing (e.g., white balance, color, brightness adjustment) of the acquired digital image signal based on a setting value, and generates still image data using the acquired digital image signal.

Then, the control unit 101 outputs the generated still image data to the recording/reproducing unit 140. The recording/reproducing unit 140 writes the still image data as a still image file in the recording medium 141 based on the file system management, such as UDF or FAT.

The above-described operation is repeated each time the shutter button is operated.

Since the operations of the apparatus in the imaging standby state in the still image capturing mode are similar to the operations performed in the imaging standby state in the moving image capturing mode except that sound is not acquired, the description of the operations are not repeated.

Next, the reproduction mode will be described in detail. When the apparatus is in the reproduction mode, the control unit 101 transmits a control signal to each block of the image pick-up apparatus 100 so that the state is changed to the reproduction state, and the operation described below is performed.

The recording/reproducing unit 140 reads out a file such as a moving image file or a still image file recorded in the recording medium 141. When the moving image file is read out, the control unit 101 separates the moving image data from the audio data, and transfers the respective data pieces to the image processing unit 111 and the audio processing unit 121. In the case of the still image file, the still image data included in the still image file is transferred to the image processing unit 111. Then, the image processing unit 111 reproduces the image of the transferred moving image data or the transferred still image data, and the control unit 101 transmits the reproduced image to the display control unit 131. The display control unit 131 displays the image reproduced by the image processing unit 111 on the display unit 130.

On the other hand, the audio processing unit 121 sequentially reproduces the transferred audio data, and the control unit 101 transfers the reproduced audio signal to the audio output unit 151. The audio output unit 151 outputs the sound of the input audio signal from the built-in speaker, the connected earphone, or the connected speaker. In this manner, the moving image file or the still image file recorded in the recording medium 141 is reproduced.

If the apparatus is in the reproduction mode, the control unit 101 can control the recording/reproducing unit 140 to read out a plurality of moving image files or still image files from the recording medium 141 in advance and cause the image processing unit 111 to generate reduced images included in the files. A screen on which such images are displayed is referred to as a thumbnail display screen. The user can select a file to be reproduced by selecting an image by the operation unit 102 while viewing the thumbnail display screen.

The image pick-up apparatus according to the present exemplary embodiment performs recording and reproduction of a still image file or a moving image file as described above.

Figure 2:
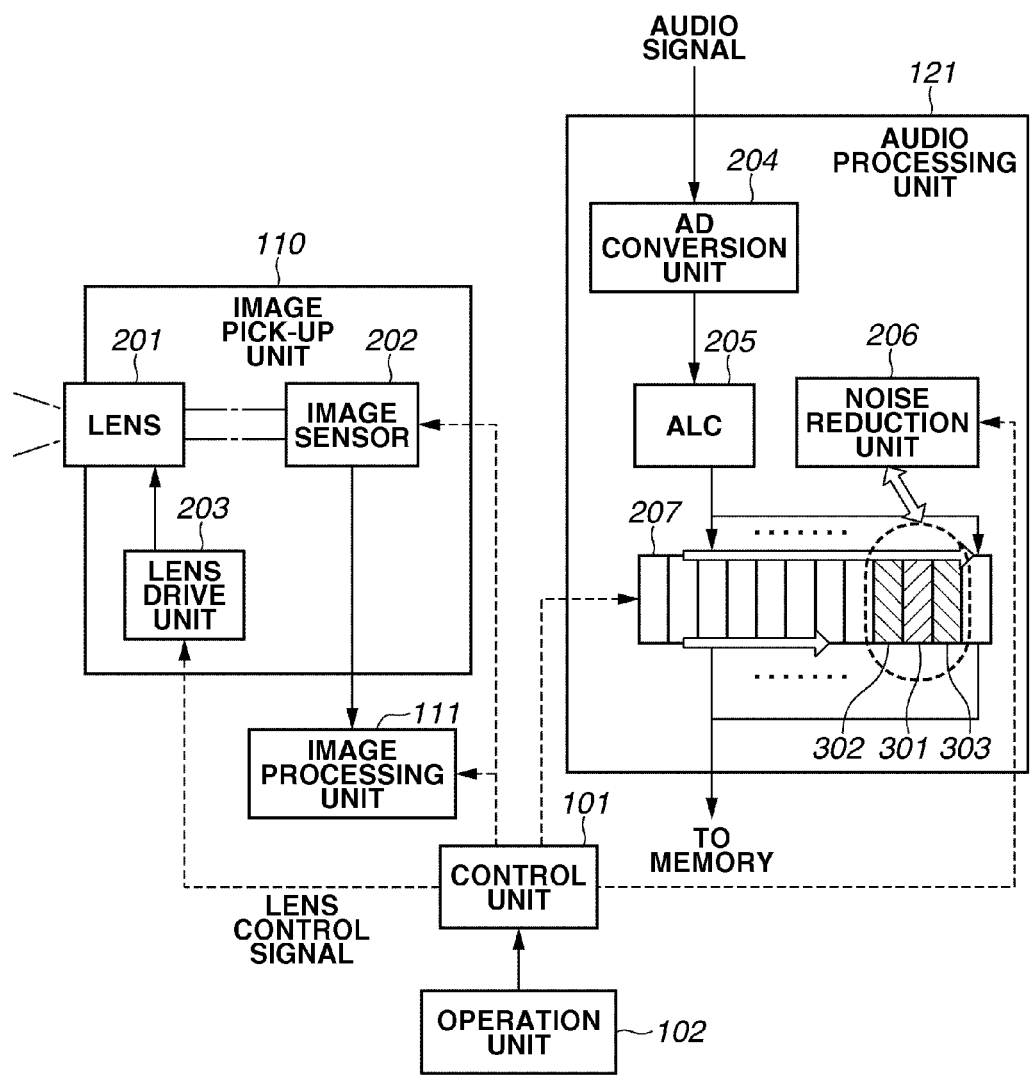
FIG. 2 is a block diagram illustrating details of an image pick-up unit and an audio processing unit.
Figure 3A:
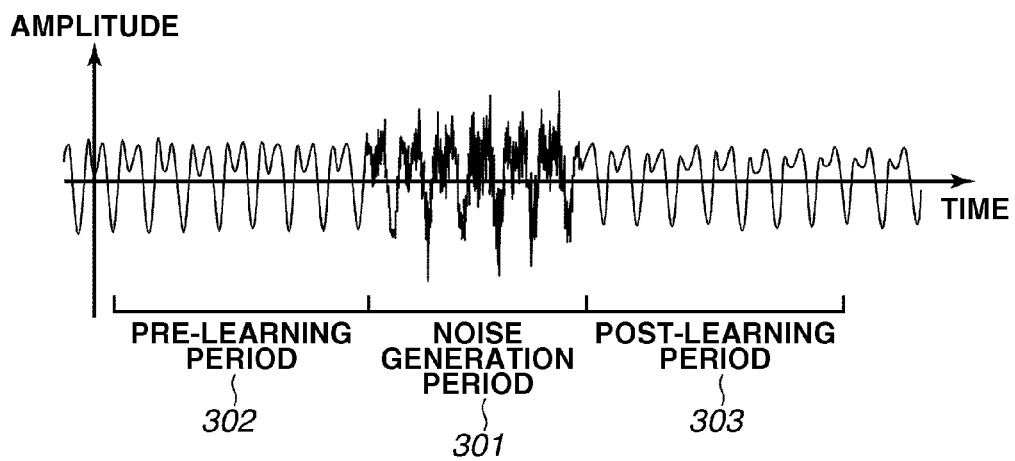
FIGS. 3A to 3C illustrate changes in an audio signal when noise reduction processing is performed.
Figure 3B:
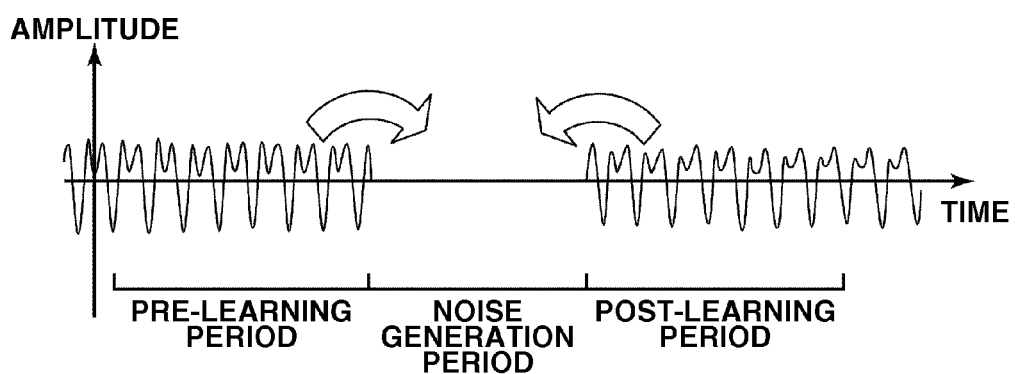
Figure 3C:
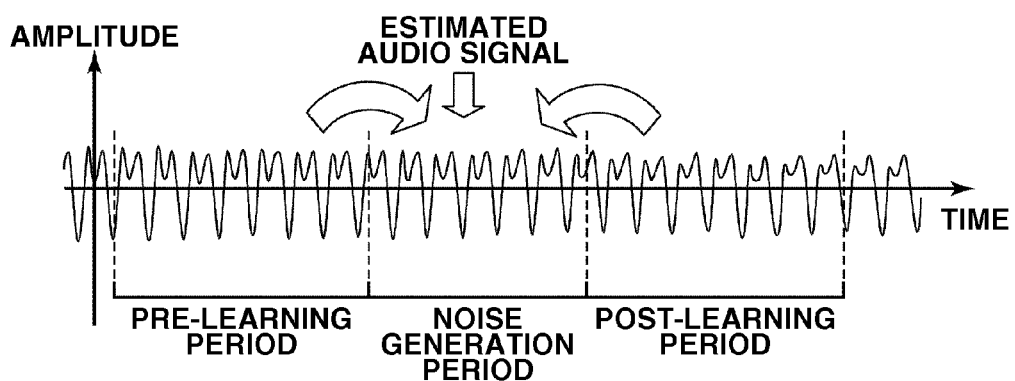

Next, the "noise reduction processing" performed by the audio processing unit 121 will be described below with reference to FIGS. 2 and 3A to 3C. FIG. 2 illustrates details of the image pick-up unit 110 and the audio processing unit 121 according to the present exemplary embodiment. FIGS. 3A to 3C illustrate changes made in an audio signal according to the noise reduction processing. Although an uncompressed audio signal is used in the description according to the present exemplary embodiment for simplicity, if the audio signal is to be compressed, the compressing processing can be executed after the noise elimination processing performed by the audio processing unit is finished.

In FIG. 2, a lens 201 includes a lens group that captures an optical image of an object and a diaphragm. An image sensor 202 converts the optical image captured by the lens 201 into an electric signal. The image sensor 202 is, for example, a CCD sensor or a CMOS sensor. A lens drive unit 203 includes a drive motor, an actuator, and a gear (drive unit) that drive the lens of the lens 201. The lens drive unit 203 also includes a microcomputer (control unit) that controls the drive unit. The lens drive unit 203 moves the lens group of the lens 201 in response to a lens control signal from the control unit 101 and also adjusts the diaphragm. The drive unit is not limited to a motor, an actuator, or a gear and can be any type of unit so long as it can move the lens or adjust the diaphragm. According to the present exemplary embodiment, the "noise reduction processing" is performed so as to reduce a sound generated by the drive unit as noise.

For example, if the user operates the zoom key of the operation unit 102 to enlarge the image, the control unit 101 transmits a lens control signal for causing the lens to move in a direction that enlarges the optical image of the object, to the lens drive unit 203 while the user is operating the zoom key. Then, while the lens drive unit 203 is receiving the lens control signal, a motor control unit of the lens drive unit 203 operates the drive unit so that the lens 201 is moved in the direction that enlarges the optical image of the object. At that time, the control unit 101 can the lens control signal by adding thereto information that instructs the drive unit to intermittently move the lens or information about a movement speed of the lens. If such information is added, the motor control unit of the lens drive unit 203 controls the drive unit by a control such as pulse width modulation (PWM) control in order to control the drive time of the lens 201.

In the case where, for example, a function referred to as the image stabilization function, which is useful in preventing blur of an captured image due to camera shake or the like, is effective, the following operation is performed. The control unit 101 sequentially transmits a lens control signal that indicates a movement amount and a movement direction of the lens 201, which is useful in preventing the image blur, to the lens drive unit 203 in response to a signal related to vibration output from the vibration detection unit (not illustrated). Then, the motor control unit of the lens drive unit 203 controls the drive direction and the drive time of the drive unit according to, for example, the PWM control so that the lens 201 is moved to the movement direction for the amount indicated by the lens control signal.

Further, for example, if autofocus is performed, the control unit 101 analyzes the input image signal and transmits a lens control signal that indicates the movement amount of the focus lens to the lens drive unit 203 so that the lens is moved and the focus of the image is adjusted. Then, the motor control unit of the lens drive unit 203 controls the drive direction and the drive time of the drive unit according to, for example, the PWM control so that the lens 201 is moved to the amount indicated by the lens control signal. Further, the lens drive unit 203 can move the focus lens while the lens drive unit 203 is receiving a control signal for causing the focus lens to move in forward or backward direction from the control unit 101. Similarly, if a luminance (light quantity) of an object is to be adjusted, the control unit 101 transmits a lens control signal that indicates an aperture amount to the lens drive unit 203. Then, the lens drive unit 203 controls the diaphragm of the lens 201 so that it is opened or closed by the amount indicated by the lens control signal by the PWM control.

In FIG. 2, an AD conversion unit 204 converts an input analog audio signal into a digital audio signal. An auto level controller (ALC) 205 adjusts the level of the input digital audio signal. The ALC 205 monitors the level of the input audio signal. If the level is too high, the ALC 205 lowers the level of the audio signal to an appropriate level. A noise reduction unit 206 is a block unit that performs the "noise reduction processing" described below in the present exemplary embodiment.

A buffer memory 207 is a memory that sequentially stores the digital audio signal input by the ALC 205 for a fixed amount of time (e.g., about 2.0 seconds). Normally, the audio signals sequentially written in the buffer memory 207 are read out by the control unit 101 in units of a predetermined sample number (e.g., 512 samples) in a first-in first-out manner, and transmitted to the memory 104 or the audio output unit 151. The control unit 101 starts reading out of the audio signal written in the buffer memory 207 when, for example, data corresponding to approximately 1.5 seconds is stored in the buffer. Afterward, the control unit 101 reads out the audio signals of a fixed amount at regular intervals so as to maintain a state that audio signals corresponding to approximately 1.5 seconds are buffered.

The "noise reduction processing" according to the present exemplary embodiment is used for reducing the noise which is generated when the drive unit of the lens drive unit 203 is operated to move the lens of the lens 201 or open and close the diaphragm as described above. FIGS. 3A to 3C illustrate the waveforms of the audio signals changed according to the processing.

In FIGS. 3A to 3C, the vertical axis indicates an amplitude level of an audio signal and the horizontal axis indicates time. FIG. 3A illustrates an audio signal input in the buffer memory 207. FIG. 3B also illustrates an audio signal from which an audio signal in a noise generation period is discarded. FIG. 3C illustrates an audio signal in which the audio signal in the noise generation period is replaced with an "estimated audio signal". The estimated audio signal is generated based on the audio signals before and/or after the audio signal in the noise generation period.

According to the present exemplary embodiment, the noise reduction processing is performed by replacing an audio signal in a noise generation period 301, which includes the noise generated by the operation of the drive unit of the lens drive unit 203, with an "estimated audio signal" which is generated based on an audio signal before and/or after the audio signal in the noise generation period 301.

The noise generation period 301 indicates the time period the drive unit of the image pick-up apparatus is operating. A pre-learning period 302 and a post-learning period 303 indicate time periods adjacent to the noise generation period 301, and the periods may be, for example, 0.2, 0.1, 0.05, or 0.02 second. The noise generation period 301 may be, for example, 0.1, 0.07, or 0.05 second. According to the present exemplary embodiment, the noise generation period is controlled so that it is, for example, about 0.1 second at the maximum.

The "noise reduction processing" is executed according to the control unit 101 transmitting an instruction for causing the noise reduction unit 206 to perform the noise reduction processing at the same time of transmitting a lens control signal to the lens drive unit 203. On receiving the instruction, the noise reduction unit 206 reads out an audio signal in the preceding period (the pre-learning period 302) and/or in the following period (the post-learning period 303) of the noise generation period 301 from the buffer memory 207. The audio signal in the noise generation period 301 can be also read out at the same time. Then, the noise reduction unit 206 generates an "estimated audio signal" that can replace the audio signal in the noise generation period 301 of the audio signal recorded in the buffer memory 207 from the audio signal in the pre-learning period 302 and/or the post-learning period 303.

Next, the noise reduction unit 206 writes the "estimated audio signal" in the address corresponding to the noise generation period 301 of the buffer memory 207. This operation is performed after the audio signal is written in the buffer memory 207 and before the audio signal is read out. The "estimated audio signal" is an audio signal which is generated based on the audio signal in the preceding period (the pre-learning period 302) and/or in the following period (the post-learning period 303) of the noise generation period 301. The generation method of the "estimated audio signal" is described below. In this manner, from the audio signal including the noise such as the audio signal illustrated in FIG. 3A, the audio signal illustrated in FIG. 3C, where the audio signal in the noise generation period is replaced with the generated audio signal, can be obtained.

The noise reduction unit 206 obtains the audio signal ("estimated audio signal") that can replace the audio signal in the noise generation period 301 from the audio signal in the periods (the pre-learning period 302 and the post-learning period 303) before and after the noise generation period 301. As described above, the pre-learning period 302 corresponds to the audio signal acquired before the noise generation period 301 and the post-learning period 303 corresponds to the audio signal acquired after the noise generation period 301.

Further, the noise reduction unit 206 can start the "noise reduction processing" immediately after it receives the noise reduction processing execution instruction from the control unit 101, or start the noise reduction processing after the audio signal corresponding to the noise generation period 301 is acquired. Further, the noise reduction unit 206 can start the noise reduction processing after the audio signal in the post-learning period 303 is acquired.

For example, if the noise reduction processing is executed immediately after the noise reduction unit 206 receives the noise reduction processing execution instruction from the control unit 101, on receiving the instruction, the noise reduction unit 206 reads out the audio signal in the pre-learning period 302. Then, based on a portion or all the audio signals in the pre-learning period 302, an audio signal for interpolating the audio signal in the noise generation period 301 is generated. Then, after the elapse of the noise generation period 301, in order to interpolate the audio signal in the noise generation period 301, the noise reduction unit 206 writes the generated audio signal in the address corresponding to the noise generation period 301 of the buffer memory 207. If the noise generation period 301 is not yet elapsed, the noise reduction unit 206 writes the generated audio signal in the address corresponding to the noise generation period 301 of the buffer memory 207 after the noise generation period 301 has elapsed.

Further, for example, if the noise reduction processing is started after the audio signal in the post-learning period 303 is acquired, the noise reduction unit 206 starts the noise reduction processing after receiving the instruction and further after the period corresponding to the noise generation period 301 and the period corresponding to the post-learning period 303 have elapsed. Thus, the start of the processing is delayed for a time period that corresponds to the post-learning period 303 from the period corresponding to the noise generation period 301, which is identified based on the information about the noise generation period transmitted from the control unit 101.

Next, a generation method of the audio signal (i.e., "estimated audio signal") which replaces the audio signal in the noise generation period 301 will be described. In the following description, a value of the audio signal in the pre-learning period 302 is used in calculating the subsequent audio signal. By sequentially repeating the calculation, a pre-estimated audio signal using the value of the audio signal in the pre-learning period can be generated.

According to the present exemplary embodiment, after drawing a linear predictive coefficient, the audio signal in the noise generation period 301 is calculated using the obtained linear predictive coefficient. The linear prediction is used based on the assumption that a linear combination relation described below exists between the current signal and a finite number ("p" pieces) of adjacent sampled values. More specifically, when the sampling rate is 48 kHz and the learning period is 0.05 second, 2400 samples correspond to the above-described "p" pieces. The learning period, however, is not limited to 0.05 second. Further, all of the 2400 samples are not necessarily used in the calculation.

$$x_t + \alpha_1 x_{t-1} + \ldots + \alpha_p x_{t-p} = \epsilon_t \quad \text{[Mathematical expression 1]}$$

According to the present exemplary embodiment, mathematical expression 1 is applied to an audio signal, $\epsilon_t$ is a random variable where the mean value is 0 and the variance $\sigma^2$ are uncorrelated. If the mathematical expression is converted where $x_t$ is a value calculated from the value of the past (i.e., $x_{t-1}, x_{t-2}, x_{t-3} \ldots$), the following mathematical expression is obtained.

$$x_t = -\alpha_1 x_{t-1} - \ldots - \alpha_p x_{t-p} + \epsilon_t \quad \text{[Mathematical expression 2]}$$
$$= -\sum_{i=1}^{p} \alpha_i x_{t-i} + \epsilon_t$$

According to mathematical expression 2, if $\epsilon_t$ is small enough, the current value can be expressed as a linear sum of p pieces of values in the vicinity. After obtaining $x_t$ from the above-described prediction, if the approximation is proper enough, $x_{t+1}$ can also be obtained from a linear sum of p pieces of values in the vicinity. If $\epsilon_t$ is satisfactorily small, the value can be sequentially estimated and the signal can be obtained. Thus, a way to obtain $\alpha_i$ (linear predictive coefficient) that minimizes $\epsilon_t$ will be considered. According to the present invention, an operation for obtaining $\alpha_i$ that minimizes $\epsilon_t$ is referred to as a learning operation.

Then, regarding the above-described learning period, $$\Sigma \epsilon_t^2 \quad \text{[Mathematical expression 3]}$$

is to be minimized. Where learning start time is $t_0$ and end time is $t_1$, $$\Sigma \epsilon_t^2 \quad \text{[Mathematical expression 4]}$$

will be expressed by the equation below according to mathematical expression 1.

$$\sum_{t=t_0}^{t_1} \epsilon_t^2 = \sum_{t=t_0}^{t_1} \left( \sum_{i=0}^{p} \alpha_i x_{t-i} \right)^2 \quad \text{[Mathematical expression 5]}$$
$$= \sum_{t=t_0}^{t_1} \sum_{i=0}^{p} \sum_{j=0}^{p} \alpha_i \alpha_j x_{t-i} x_{t-j}$$

where $\alpha_0 = 1$.

In order to simplify the equation, where $$c_{ij} = \sum_{t=t_0}^{t_1} x_{t-i} x_{t-j} \quad \text{[Mathematical expression 6]}$$

in order to determine $\alpha_i$ that minimizes mathematical expression 3, partial differentiation of $\alpha_j$ (j=1, 2, . . . p) of mathematical expression 3 is set to 0.

In other words, the mathematical expression below is obtained.

$$\frac{\partial}{\partial \alpha_i} \sum_{t=t_0}^{t_1} \epsilon_t^2 = \frac{\partial}{\partial \alpha_i} \left( \sum_{i=0}^{p} \sum_{j=0}^{p} \alpha_i c_{ij} \alpha_j \right) \quad \text{[Mathematical expression 7]}$$
$$= 2 \sum_{i=0}^{p} \alpha_i c_{ij}$$

Mathematical expression 7 indicates that $\alpha_1$ can be determined by solving p pieces simultaneous linear equations. In mathematical expression 7, $c_{ij}$ can be obtained from $x_{t-i}$ (i=1, 2, . . . p).

In other words, $\alpha_i$ (linear predictive coefficient) can be obtained from mathematical expression 7.

If $\alpha_i$ is determined according to mathematical expression 7, $$\Sigma \epsilon_t^2 \quad \text{[Mathematical expression 8]}$$

is minimized. According to mathematical expression 2, good approximation can be obtained where the value of $x_t$ is as in mathematical expression 9.

$$-\sum_{i=1}^{p} \alpha_i x_{t-i} \quad \text{[Mathematical expression 9]}$$

If this approximate is proper enough, $$-\sum_{i=1}^{p} \alpha_i x_{t-i} \quad \text{[Mathematical expression 10]}$$

can be used as a prediction signal in place of $x_t$.

Further, regarding $x_{t+1}$, using a similar calculation by using p−1 pieces of values in the vicinity and $x_t$ obtained by the prediction, an approximate value can be obtained. Further, by sequentially repeating this calculation, signals $x_t, x_{t+1}, x_{t+2}, \ldots$ in the prediction period can be generated. According to the present exemplary embodiment, prediction calculation of data of a sample number corresponding to the length of the noise generation period 301 output by the control unit 101 is repeated until the prediction calculation is finished. In this manner, the "pre-estimated audio signal" can be generated.

According to the present exemplary embodiment, the "pre-estimated audio signal" is generated based on the audio signal corresponding to 0.05 second immediately before the noise generation period 301, however, the "pre-estimated audio signal" can be generated from an audio signal before the noise generation period 301, which is not limited to the immediately before the noise generation period 301. Further, the "pre-estimated audio signal" can be generated based on not the audio signal corresponding to 0.05 second before the noise generation period 301 but on an audio signal corresponding to 0.1 or 0.2 second.

By applying the "pre-estimated audio signal" generation operation to the calculation from the newer to the older audio signal in time series of the post-learning period 303, the "post-estimated audio signal" can be generated in a similar manner.

According to the present exemplary embodiment, an estimated audio signal is generated, for example, by combining the "pre-estimated audio signal" and the "post-estimated audio signal" obtained from the calculation in cross fading manner or by applying the "pre-estimated audio signal" to the first half and the "post-estimated audio signal" to the latter half. Further, the "pre-estimated audio signal" or the "post-estimated audio signal" can be exclusively used as the estimated audio signal.

If cross fading is used for combining, the estimated audio signal at timing closer to the pre-learning period 302 is generated based on a higher ratio of the "pre-estimated audio signals" calculated from the pre-learning period 302 and lower ratio of the "post-estimated audio signals" calculated from the post-learning period 303. Regarding the estimated audio signal near the center of the noise generation period, the ratios of the "pre-estimated audio signals" and the "post-estimated audio signals" are substantially the same. Further, the estimated audio signal at timing closer to the post-learning period 303 is generated based on a lower ratio of the "pre-estimated audio signals" calculated from the pre-learning period 302 and higher ratio of the "post-estimated audio signals" calculated from the post-learning period 303.

The noise reduction processing is performed by replacing the audio signal in the noise generation period 301 with the "estimated audio signal" generated in the manner as illustrated in FIG. 3C. In other words, the address corresponding to the noise generation period 301 of the buffer memory 207 is overwritten with the value of the generated "estimated audio signal" by the noise reduction unit 206.

According to the present exemplary embodiment, the noise reduction processing is performed by the noise reduction unit 206 overwriting the noise in the noise generation period 301 with an estimated audio signal obtained by calculation using an audio signal in the pre-learning period 302 or the post-learning period 303, which does not include noise.

According to the present exemplary embodiment, although the linear prediction is used in the "noise reduction processing", other methods can also be used so long as the audio signal in the noise generation period is calculated based on the audio signal at least before or after the noise generation period 301. For example, the estimated audio signal can be obtained by detecting correlation of the waveforms of the audio signals whose repeatability is high in the pre-learning period 302 and using the repeated waveform as the estimated audio signal. Similarly, the estimated audio signal can be calculated from the audio signal in the post-learning period 303. In other words, any method can be used so long as the audio signal in the noise generation period is replaced with the estimated audio signal which is generated based on the audio signal before and/or after the noise generation period.

Further, according to the present exemplary embodiment, as illustrated in FIG. 3B, after the audio signal in the noise generation period is discarded, the noise generation period is overwritten with the estimated audio signal. However, without discarding the audio signal in the noise generation period, the address of the noise generation period of the buffer memory 207 can be simply overwritten with the estimated audio signal.

Next, a case where an image being captured is enlarged by the user operating the zoom key while the image pick-up apparatus 100 performs the recording operation (moving image recording) will be described with reference to FIGS. 4, 5, and 6. FIG. 4 illustrates the operation performed by the image pick-up apparatus 100 according to the present exemplary embodiment when the apparatus is recording a moving image (moving image recording) and the user operates the zoom key so as to enlarge the image being captured.

FIG. 5 is a flow chart illustrating the operations executed by the control unit 101 when the above-described operation is performed. FIG. 6 is a flow chart illustrating the operations executed by the control unit 101 especially after the image enlargement instruction is ended. Operations illustrated in FIGS. 5 and 6 are controlled and executed by the control unit 101. Further, according to the present exemplary embodiment, although a case where the image is enlarged is described, a similar idea can be applied to a case where the image is reduced.

First, an operation flow of the image pick-up apparatus 100 which is performed when the user operates the zoom key during the moving image recording will be described with reference to FIGS. 5 and 6. Then, a concrete operation of the image pick-up apparatus 100 when the zoom operation is performed will be described with reference to FIG. 4

Figure 6:
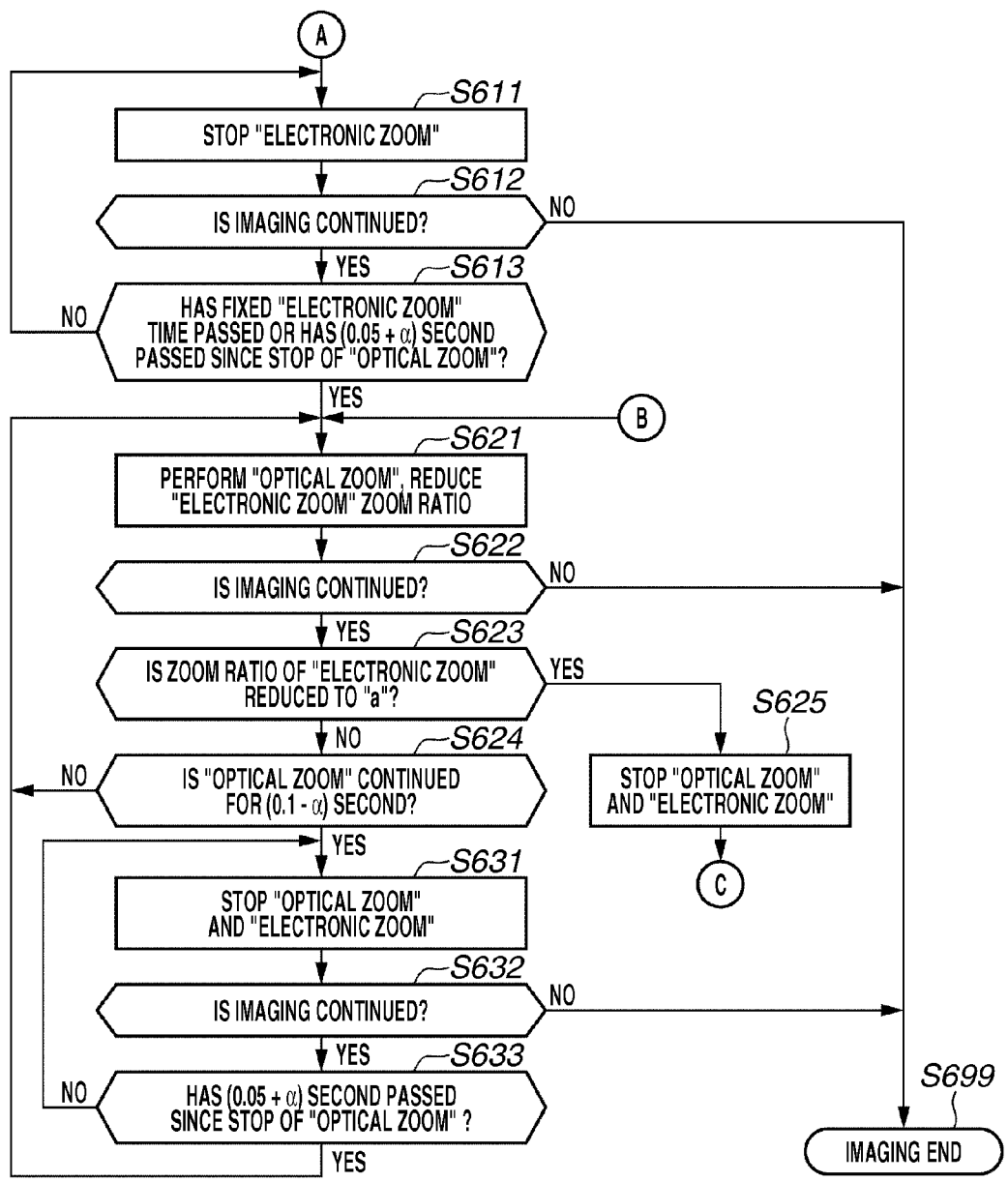
FIG. 6 is a flowchart illustrating processing of the image pick-up apparatus which is performed when the enlargement operation is finished.

<Operation Flow> (FIGS. 5 and 6)

In step S500, when a moving image capturing start instruction is transmitted from the operation unit 102, the control unit 101 instructs each block of the image pick-up apparatus 100 to start the imaging operation. The obtained moving image data is sequentially recorded in the recording medium.

In step S510, the control unit 101 determines whether the zoom instruction is input via the operation unit 102. If the zoom instruction is input (YES in step S510), the processing proceeds to step S511. In step S511, the control unit 101 instructs the image processing unit 111 to perform the enlargement operation of the "electronic zoom" at a fixed ratio for a fixed period of time.

In step S512, the control unit 101 monitors whether the imaging is continued. If the imaging is continued (YES in step S512), the processing proceeds to step S513. In step S513, the control unit 101 monitors whether the zoom instruction is continuously input. If the zoom instruction is continuously input (YES in step S513), then in step S514, the control unit 101 controls the image processing unit 111 to continue the enlargement by "electronic zoom" at the fixed ratio until the fixed period of time elapses. During this period, since the "optical zoom" is not operating, the zoom lens is not driven and the noise is not generated.

The reason for using the "electronic zoom" for the fixed period of time to enlarge the image is to prevent the noise caused by the drive of the zoom lens from contaminating the audio signal in the pre-learning period 302. For example, if 0.05 second of the pre-learning period 302 is necessary, then, the image is enlarged by the "electronic zoom" at least during that period, and the "optical zoom" is not operated. In other words, the "optical zoom" is operated placing an interval more than 0.05 second.

In step S512, if the control unit 101 determines that an imaging end instruction signal is input from the operation unit 102 (NO in step S512), the processing proceeds to step S599. In step S599, the control unit 101 transmits the imaging end instruction to each block of the image pick-up apparatus 100, and the imaging ends.

In step S513, if the control unit 101 determines that the zoom instruction is no longer transmitted from the operation unit 102 (NO in step S513), then the processing proceeds to processing "A" in FIG. 6 which is the processing after the image enlargement instruction is ended. The processing illustrated in FIG. 6 will be described after the description of the flow chart illustrated in FIG. 5.

In step S514, if the control unit 101 determines that the "electronic zoom" has been operated for the fixed period of time (YES in step S514), the processing proceeds to step S521. In step S521, the control unit 101 instructs the lens drive unit 203 of the image pick-up unit 110 to perform the enlargement operation of the "optical zoom" at a fixed ratio. Thus, the control unit 101 transmits to the lens drive unit 203 a lens control signal that causes the zoom lens to move in the enlargement direction at a fixed speed.

At the same time, the control unit 101 controls the "electronic zoom" of the image processing unit 111 to be reduced at a fixed ratio so that an apparent zoom ratio (i.e., "overall zoom ratio" described below) of the image is increased at a fixed ratio. In other words, at this time, the image pick-up apparatus 100 of the present exemplary embodiment increases the zoom ratio of the "optical zoom" at the fixed ratio and reduces the zoom ratio of the "electronic zoom" at the fixed ratio so that the enlargement ratio realized by the incorporation of these zoom ratios is seemingly the same as the enlargement ratio of the zoom ratio in step S511.

In this manner, according to the present exemplary embodiment, although both the "electronic zoom" and the "optical zoom" are operated, the apparent zoom ratio ("overall zoom ratio") is increased at a constant rate to enlarge the image. Thus, it is not necessary to increase the zoom ratio of the "optical zoom" at the fixed ratio. In that case, in order to maintain the constant apparent zoom ratio, the "electronic zoom" is not necessarily reduced at the fixed ratio. The specific zoom ratio will be described below with reference to FIG. 4.

In step S522, the control unit 101 monitors whether imaging is continued. If the imaging is continued (YES in step S522), the processing proceeds to step S523. In step S523, the control unit 101 monitors whether the zoom instruction is continuously input. While monitoring whether the zoom instruction is continuously input, in step S525, the operation is continued until a first predetermined time has elapsed from the start of the operation of the "optical zoom". Or in step S524, the control unit 101 continues the operation until the zoom ratio of the "electronic zoom" is reduced to a predetermined value "a" before the first predetermined time has elapsed from the start of the operation of the "optical zoom". According to the present exemplary embodiment, the zoom ratio "a" is a zoom ratio which is not operating the "electronic zoom", in other words, the zoom ratio "a" is 1×. However, a predetermined zoom ratio such as 1.2× or 0.8× may also be used.

The first predetermined time is a time period obtained by subtracting a period including a reverberant sound caused by the drive noise of the lens drive from 0.1 second. The period of the reverberant sound is a generation period α (see FIG. 4) during which a reverberant noise 432 is generated. The reverberant noise 432 is generated according to the generation of the drive noise (a noise 431 in FIG. 4) due to the movement of the zoom lens. The reverberant noise 432 is generated for the period α after the movement of the zoom lens is finished. The generation period α can be obtained in an experimental manner.

According to the present exemplary embodiment, the operation of the optical zoom is limited such that the noise generated according to the movement of the zoom lens and the reverberant noise of such a noise lasts for 0.1 second at the maximum. In other words, the optical zoom is a continuous operation in 0.1 second or less. This is because the above-described "noise generation period" in the "noise elimination processing" is set to 0.1 second. If a longer time can be set for this period, the first predetermined time is not limited to (0.1−α) second and a longer time period can be set.

In step S522, if the imaging end instruction signal is input via the operation unit 102 (NO in step S522), the processing proceeds to step S599. In step S599, the control unit 101 transmits the imaging end instruction to each block of the image pick-up apparatus 100, and the imaging ends. In step S523, if the zoom instruction is not continuously input via the operation unit 102 (NO in step S523), then the processing proceeds to processing "B" in FIG. 6 which is the processing after the image enlargement instruction is ended. The processing illustrated in FIG. 6 will be described after the description of the flow chart illustrated in FIG. 5.

In step S524, if the control unit 101 determines that the zoom ratio of the "electronic zoom" is reduced to the predetermined zoom ratio "a" (YES in step S524), the processing proceeds to step S531. Further, in step S525, if the control unit 101 determines that the operation time of the "optical zoom" has reached the first predetermined time (0.1 second −α) (YES in step S525), the processing proceeds to step S531. In step S531, the control unit 101 controls the lens drive unit 203 to stop the "optical zoom".

As described above, the control unit 101 controls the "optical zoom" of the lens drive unit 203 and the "electronic zoom" of the image processing unit 111 so that the apparent zoom ratio (overall zoom ratio) of the image is increased at the fixed ratio. Thus, in step S531, the control unit 101 controls the lens drive unit 203 to stop the "optical zoom" and also controls the image processing unit 111 so that the zoom ratio of the "electronic zoom" is increased at a fixed ratio from the state the "electronic zoom" is reduced at the fixed ratio.

In step S532, the control unit 101 monitors whether the imaging is continued. If the imaging is continued (YES in step S532), the processing proceeds to step S533. In step S533, the control unit 101 monitors whether the zoom operation is continuously performed. If the zoom operation is continuously performed (YES in step S533), then in step S534, the control unit 101 continues the "electronic zoom" for a second predetermined time.

The second predetermined time is a time period obtained by adding the generation period α of the reverberant noise 432 to 0.05 second. In other words, the "electronic zoom" is continued until (0.05+α) second is elapsed from the stop of the "optical zoom". The "optical zoom" is stopped for the second predetermined time, so that the drive noise of the "optical zoom" and the reverberant noise are not included in at least 0.05 second in "the pre-learning period 302" and/or "the post-learning period 303". "α" corresponds to the generation period α of the above-described reverberant noise 432.

During this period, the noise reduction unit 206 of the audio processing unit 121 reduces the noise by overwriting the audio signal corresponding to the noise generation period 301, which includes the noise generated by the "optical zoom", with the "estimated audio signal" generated from the audio signal of the period adjacent to the noise generation period 301. According to the present exemplary embodiment, since the noise generation period 301 is 0.1 second at the maximum and the pre-learning period 302 and/or the post-learning period 303 is at least 0.05 second, these values are used.

In step S534, if the second predetermined time has elapsed (YES in step S534), the processing returns to step S521. The control unit 101 continues the processing from steps S521 to S534 so long as the imaging operation and the zoom operation are continued. The processing does not need to return to step S521 and start the "optical zoom" immediately after a lapse of the second predetermined time, but start the "optical zoom" at arbitrary timing. In other words, the "optical zoom" can be operated at any timing so long as the "optical zoom" is not operated until the elapse of at least the second predetermined time. Then, the processing in steps S521 to S534 is repeatedly performed.

In step S532, if the control unit 101 determines that the imaging end instruction signal is input via the operation unit 102 (NO in step S532), the processing proceeds to step S599. In step S599, the control unit 101 transmits the imaging end instruction to each block of the image pick-up apparatus 100, and the imaging ends. Further, in step S533, if the control unit 101 determines that the zoom instruction is no longer input via the operation unit 102 (NO in step S533), then the processing proceeds to processing "A" in FIG. 6 which is the processing after the image enlargement instruction is ended.

Next, the processing A which is performed when the user releases the zoom key of the operation unit 101 and input of the zoom instruction via the operation unit 102 is stopped will be described with reference to FIG. 6.

As described above, in step S513 or S533, if the zoom instruction signal is no longer transmitted from the operation unit 102 (NO in step S513 or S533), the processing proceeds to step S611. In step S611, the control unit 101 the zoom operation is stopped and stops the electronic zoom so that further change in the apparent zoom ratio of the image is not made.

In step S612, the control unit 101 monitors whether the imaging is continued. If the imaging is continued (YES in step S612), the processing proceeds to step S613. In step S613, the control unit 101 determines whether a fixed period of time has elapsed from the start of the "electronic zoom" operation in step S511 or the second predetermined time has elapsed from the stop of the "optical zoom" operation in step S531. As is the second predetermined time described above, the second predetermined time in this step is the time necessary in securing the pre-learning period 302 and/or the post-learning period 303. The second predetermined time is, for example, (0.05+α) second.

If the control unit 101 determines that the fixed period of time has elapsed from the start of the "electronic zoom" operation or the second predetermined time has elapsed from the stop of the "optical zoom" operation (YES in step S613), the processing proceeds to step S621. In step S523, if the zoom instruction signal is no longer transmitted from the operation unit 102 (NO in step S523), the processing also proceeds to step S621.

In step S621, the control unit 101 controls the lens drive unit 203 to move the zoom lens in the enlargement direction at a fixed speed so that the image is enlarged by the "optical zoom" at a fixed ratio. Since the zoom operation is finished, the apparent zoom ratio needs to be maintained so that it is not increased or reduced. Thus, the control unit 101 controls the image processing unit 111 to reduce the zoom ratio of the "electronic zoom".

Unlike the processing in step S521 in which the overall zoom ratio is increased at the fixed ratio by the combination of the "optical zoom" and the "electronic zoom", in step S621, in which the overall zoom ratio is maintained unchanged, the zoom ratio of the "electronic zoom" is rapidly reduced. This is clear from the graph in FIG. 4 described below. According to the processing in step S621, since the zoom ratio of the "electronic zoom" for enlarging the image is reduced and the zoom ratio of the "optical zoom" is increased, good image quality of the moving image can be obtained.

In step S622, the control unit 101 monitors whether the imaging is continued. If the imaging is continued (YES in step S622), in step S624, the control unit 101 continues this operation until the first predetermined time is elapsed from the start of the "optical zoom" similar to the above-described operation. Or in step S623, the control unit 101 continues this operation until the zoom ratio of the "electronic zoom" is reduced to the predetermined value "a" before the first predetermined time has elapsed from the start of the operation of the "optical zoom". The first predetermined time and the zoom ratio "a" of the "electronic zoom" are similar to those described with reference to FIG. 5.

In step S623, if the control unit 101 determines that the zoom ratio of the "electronic zoom" is reduced to the above-described predetermined zoom ratio "a" (YES in step S623), the processing proceeds to step S625. In step S625, the control unit 101 stops the operations of the "electronic zoom" and the "optical zoom", and the processing proceeds to step S510 in FIG. 5. More specifically, the control unit 101 controls the lens drive unit 203 to stop the drive of the zoom lens and simultaneously controls the image processing unit 111 so that the enlargement/reduction of the image by the electronic zoom is not performed. In this state, the apparent zoom of the image is performed mostly on the "optical zoom". Thus the image is not deteriorated due to the electronic enlargement processing.

On the other hand, in step S624, if the first predetermined time is elapsed from the start of the operation of the "optical zoom" (YES in step S624), the processing proceeds to step S631. In step S631, the control unit 101 stops the operations of the "electronic zoom" and the "optical zoom". More specifically, the control unit 101 controls the lens drive unit 203 to stop the drive of the zoom lens and simultaneously controls the image processing unit 111 so that the enlargement/reduction of the image by the electronic zoom is not performed.

In step S632, the control unit 101 monitors whether the imaging is continued. If the imaging is continued (YES in step S632), the processing proceeds to step S633. In step S633, the control unit 101 controls the lens drive unit 203 so as not to drive the zoom lens to stop the "optical zoom" is stopped until the second predetermined time is elapsed. The second predetermined time is a time similar to the time used in step S534. During the second predetermined time, the "optical zoom" is stopped so that the drive noise of the "optical zoom" is not added in at least 0.05 second in "the pre-learning period 302" and/or "the post-learning period 303".

In step S633, when the second predetermined time is elapsed (YES in step S633), the processing returns to step S621. Then, the processing in step S621, and the control unit 101 continues the processing in steps S621 to S633 until the zoom ratio of the "electronic zoom" reaches the zoom ratio "a". The processing does not need to return to step S621 and start the "optical zoom" immediately after a lapse of the second predetermined time, but start the "optical zoom" at arbitrary timing. In other words, the "optical zoom" can be operated at any timing so long as the "optical zoom" is not operated until the elapse of at least the second predetermined time.

During this period, the noise reduction unit 206 of the audio processing unit 121 reduces the noise by overwriting the audio signal corresponding to the noise generation period 301, which includes the noise generated by the "optical zoom", with the "estimated audio signal" generated from the audio signal of the period adjacent to the noise generation period 301. According to the present exemplary embodiment, since the noise generation period 301 is 0.1 second at the maximum and the pre-learning period 302 and/or the post-learning period 303 is at least 0.05 second, these values are used.

In steps S612, S622, and S632, if the control unit 101 receives an imaging end instruction from the operation unit 102 (NO in step S612, S622, and S632), the processing proceeds to step S699. In step S699, the control unit 101 transmits an imaging end instruction to each block of the image pick-up apparatus 100, and then the processing ends.

If the user operates the operation unit 102 and performs the zoom operation again, the control unit 101 receives a zoom instruction signal from the operation unit 102, and the processing returns to step S510. Then, the control unit 101 controls each block of the image pick-up apparatus 100 again as described with respect to the flowchart in FIG. 5.

<Practical Operation> (FIG. 4)

Next, the change in the "electronic zoom ratio" of the "electronic zoom", the "optical zoom ratio" of the "optical zoom", and the "overall zoom ratio" which is obtained by combining the "electronic zoom ratio" and the "optical zoom ratio" according to the zoom operation performed by the user will be described with reference to FIG. 4. The timing the lens is driven, the timing the noise is generated, and further, the "learning period" and the "noise generation period" used in the "noise reduction processing" according to the present exemplary embodiment will be described.

FIG. 4 illustrates the operations of the image pick-up apparatus 100 in the moving image recording state when the user operates the zoom key to enlarge the image being captured according to the present exemplary embodiment.

In FIG. 4, the horizontal axis indicates time. A zoom operation period 410 indicates a period that the zoom key of the operation unit 102 is turned ON by the user. According to the present exemplary embodiment, the zoom key is turned ON at a timing T411 and turned OFF at a timing T412.

A lens driving period 420 indicates a period that the zoom lens of the lens 201 is operated. According to the present exemplary embodiment, the drive of the zoom lens is started at a timing T421 and stopped at a timing T422. Further, the drive is started again at a timing T423 and stopped at a timing T424.

A noise generation period 430 is a noise generation period in which the noise is generated according to the drive of the zoom lens. The noise 431 is generated by the drive of the drive unit that moves the zoom lens, and the reverberant noise 432 is the residual noise that reverberates in the image pick-up apparatus after the drive of the drive unit. In other words, the noise 431 is generated in the period between timing T421 and timing T422 when the zoom lens is operated, and the reverberant noise 432 is generated after timing T422.

An audio signal period 440 indicates which audio signal obtained at the timing of the movement of the zoom lens corresponds to the sound in a period in the "noise reduction processing". In other words, the audio signal period 440 indicates which is the "pre-learning period", the "noise generation period", or the "post-learning period".

Regarding the graph illustrated in FIG. 4, the vertical axis includes a zoom magnification ratio 450 which is magnification of the image displayed on the display unit 130 or recorded in the recording medium 141. An optical zoom ratio 451 is the "optical zoom" function described above. The optical zoom ratio 451 is the magnification according to which the optical image of the object obtained by the lens 201 is enlarged.

An electronic zoom ratio 452 represents the magnification according to which a portion of the image obtained by the image pick-up unit 110 is clipped and enlarged by the image processing unit 111 according to the above-described "electronic zoom" function. An overall zoom ratio 453 is the enlargement zoom ratio obtained by combining the "optical zoom" and the "electronic zoom". The overall zoom ratio 453 represents the enlargement zoom ratio of the image (moving image) displayed on the display unit 130 or recorded in the recording medium 141.

According to the present exemplary embodiment, the optical zoom ratio 451 and the electronic zoom ratio 452 are adjusted so that the magnification of the overall zoom ratio 453 is increased at a fixed ratio while the user operates the zoom key. Thus, the control unit 101 transmits the lens control signal to the lens drive unit 203 to perform control thereof at the timing the "optical zoom" is operated. Further, the control unit 101 transmits the control signal for adjusting the zoom ratio of the "electronic zoom" to the image processing unit 111 so that the zoom ratio of the overall zoom ratio 453 is increased at the fixed ratio. In this manner, the control unit 101 controls the zooming operation.

A period 460 represents an abbreviated period in FIG. 4 in which illustration of a certain period is omitted. During this period, the zoom operation is continuously performed, the optical zoom ratio 451 is set to a fixed magnification, and the electronic zoom ratio 452 is increased at a fixed ratio before/after the period 460.

A processing block 470 indicates a length of a block unit including audio signal samples in a fixed period which are read out from the buffer memory 207 in the audio processing unit 121 to the noise reduction unit 206 or the memory 104. Basically, the audio processing unit 121 reads out or writes the audio data from/to the buffer memory 207 in units of the processing block.

In the description below, the corresponding steps in FIGS. 5 and 6 are also added.

When an imaging start instruction signal is input via the operation unit 102, the control unit 101 transmits the imaging start instruction to each block of the image pick-up apparatus 100 (step S500).

(Period from Timing T411 to Timing T421)

At timing T411, if the user inputs a zoom instruction by operating a button of the operation unit 102, the control unit 101 determines that the zoom operation has been input (step S510).

During the period from timing T411 to timing T421, the control unit 101 controls the image processing unit 111 so that the "electronic zoom" is continuously increased at a fixed ratio. Further, during this period, the control unit 101 controls the lens drive unit 203 so that the "optical zoom" is not operated (steps S511 to S514).

As illustrated in FIG. 4, although the electronic zoom ratio 452 is increased at the fixed ratio for a fixed period from timing T411 to timing T421, the optical zoom ratio 451 is not changed. Further, the overall zoom ratio 453 is increased at a ratio same as the electronic zoom ratio 452. In this period, since the zoom lens is not moved, the noise is not generated. This period is set as the pre-learning period 302 by the audio processing unit 121.

(Period from Timing T421 to Timing T422)

When the control unit 101 detects that the fixed period from timing T411 to timing T421 has elapsed (YES in step S514), the control unit 101 controls the lens drive unit 203 so that the zoom ratio of the "optical zoom" is increased at a fixed ratio. On the other hand, at that same time, the control unit 101 controls the image processing unit 111 so that the zoom ratio of the "electronic zoom" is reduced at a fixed ratio (step S521). This operation is continued until the first predetermined period is elapsed (steps S521 to S525).

As for the enlargement ratio in the period from timing T421 to timing T422, as illustrated in FIG. 4, although the optical zoom ratio 451 is increased, the electronic zoom ratio 452 is reduced. Further, the overall zoom ratio 453 is increased at an enlargement ratio substantially the same as the enlargement ratio in the period from timing T411 to timing T421. In other words, the ratio of the optical zoom ratio with respect to the overall zoom ratio is increased.

During the period from timing T421 to timing T422, the lens drive unit 203 drives the lens according to the lens drive signal from the control unit 101. Thus, as the noise generation period 430 indicates, the noise 431 is generated due to the drive of the lens from timing T421 to timing T422, and further, the reverberant noise 432 is generated in the time period α after timing T422. The audio processing unit 121 sets the period obtained by adding the generation period α of the reverberant sound to the period from timing T421 to timing T422 as the noise generation period 301.

The first predetermined period used in step S525 in FIG. 5 corresponds to the period from timing T421 to timing T422.

(Period from Timing T422 to Timing T423)

After the elapse of the first predetermined period, the control unit 101 controls the lens drive unit 203 to stop operation of the "optical zoom" (step S531). Then, the control unit 101 controls the image pick-up unit 110 so that the "optical zoom" is not operated for a period (0.05+α) second from timing T422 (i.e., the second predetermined period in FIG. 5). During this period, the control unit 101 controls the image processing unit 111 to perform the enlargement operation of the "electronic zoom" so that the overall zoom ratio is increased at the fixed ratio (steps S531 to S534).

As for the enlargement ratio during the period from timing T422 to timing T423, as illustrated in FIG. 4, the electronic zoom ratio 452 is increased, however, the optical zoom ratio 451 is not increased. Further, the overall zoom ratio 453 is increased at an enlargement ratio substantially same as the enlargement ratio in the period from timing T421 to timing T422. During this period, the increase of the overall zoom ratio 453 depends on the electronic zoom ratio 452.

The noise reduction unit 206 of the present exemplary embodiment sets the period from timing T411 to timing T421 as the "pre-learning period 302" and a time period of 0.1 second at the maximum from timing T421 as the "noise generation period 301". Further, the noise reduction unit 206 sets a time period of approximately 0.05 second from the end of the "noise generation period 301" as "the post-learning period 303". According to the above-described arbitrary processing of the "noise reduction processing", the noise included in the sound in the "noise generation period 301" is reduced.

(Period from Timing T423 to Timing T412)

When the control unit 101 detects that at least 0.05 second plus the generation period α of the reverberant noise 432 (i.e., the second predetermined period in FIG. 5) has elapsed from the stop of the "optical zoom" operation, again, the control unit 101 enlarges the image by the "optical zoom" (step S521). The control unit 101 controls the lens drive unit 203 so that the zoom ratio of the "optical zoom" is increased at a fixed ratio. On the other hand, the control unit 101 controls the image processing unit 111 so that the zoom ratio of the "electronic zoom" is reduced at a fixed ratio (step S521). This operation is continued until the first predetermined period is elapsed (steps S521 to S525).

As for the enlargement ratio from timing T423 to timing T412, as illustrated in FIG. 4, the optical zoom ratio 451 is increased, but the electronic zoom ratio 452 is reduced. Further, the overall zoom ratio 453 is increased at a fixed ratio. The zoom ratios in this period are changed at the same ratios of the optical zoom ratio 451 and the electronic zoom ratio 452 in the period from timing T421 to timing T422.

(Period from Timing T412 to Timing T424)

According to the present exemplary embodiment, the user terminates the zoom operation at timing T412. In other words, the zoom operation is terminated before the elapse of the first predetermined period from the start of the "optical zoom" operation. If the zoom operation is terminated, "NO" is selected in step S523 in FIG. 5, and the processing proceeds to step S621 ("B") in FIG. 6.

During the period from timing T412 to timing T424, the control unit 101 controls the lens drive unit 203 so that the zoom ratio of the "optical zoom" is increased at the fixed ratio same as the ratio in the period from timing T423 to timing T412. On the other hand, the control unit 101 controls the image processing unit 111 so that the zoom ratio of the "electronic zoom" is reduced at a fixed ratio (steps S624 to S621). However, since the zoom operation is terminated, it is necessary to maintain the apparent zoom ratio of the image (the overall zoom ratio 453) unchanged. Thus, the control unit 101 controls the image processing unit 111 so that the "electronic zoom" is reduced at a ratio greater than the ratio in the period from timing T423 to timing T412.

As for the enlargement ratio in the period from timing T412 to timing T424, as illustrated in FIG. 4, the optical zoom ratio 451 is increased, but the electronic zoom ratio 452 is rapidly reduced compared to that in the period from timing T423 to timing T412. The overall zoom ratio 453 is unchanged.

(Period after Timing T424)

When the control unit 101 detects that a period obtained by subtracting the generation period α of the reverberant noise 432 from 0.1 second at the maximum (i.e., the first predetermined period in FIG. 6), has elapsed from the operation of the "optical zoom", the control unit 101 controls the lens drive unit 203 to stop the operation of the "optical zoom". Since the zoom operation is already terminated, it is necessary to maintain the apparent zoom ratio of the image (the overall zoom ratio 453) unchanged. Thus, the control unit 101 further stops the reduction operation of the "electronic zoom" (step S631). As for the enlargement ratio, as illustrated in FIG. 4, no change is made to the optical zoom ratio 451, the electronic zoom ratio 452, and the overall zoom ratio 453.

Then, the control unit 101 controls the image pick-up unit 110 so that the "optical zoom" is not operated in the period obtained by adding 0.05 second to the generation period α of the reverberant noise 432 (i.e., the second predetermined period in FIG. 6) from the stop of the "optical zoom" (steps S631 to S633).

When the control unit 101 detects that the period obtained by adding 0.05 second to the generation period α of the reverberant noise 432 (i.e., the second predetermined period in FIG. 6) has elapsed from when the "optical zoom" has been stopped, the processing returns to step S621. Then, the overall zoom ratio is maintained at a constant ratio by increasing the optical zoom ratio and reducing the electronic zoom ratio.

Regarding the example in FIG. 4, if the zoom operation is not performed, the electronic zoom ratio will be eventually reduced to "a" (1×), and the overall zoom ratio will be expressed by the optical zoom ratio. In other words, the image of the moving image data being captured will be zoomed only by the optical zoom.

The image pick-up apparatus 100 according to the present exemplary embodiment can obtain sound from which a noise generated in association with the operation of the drive unit relating to imaging of the image pick-up apparatus is reduced in an effective manner.

Further, according to the image pick-up apparatus 100 of the present exemplary embodiment, natural video can be acquired in addition to obtaining the sound from which the noise generated in association with the operation of the drive unit relating to imaging of the image pick-up apparatus is reduced in an effective manner.

Although the overall zoom ratio 453 is constantly increased at a fixed ratio according to the present exemplary embodiment, the increasing rate of the zoom ratio can be adjusted in multiple stages according to the user's zoom operation. Similarly, the optical zoom ratio 451 and the electronic zoom ratio 452 are not necessarily increased or reduced at a fixed ratio. According to the present exemplary embodiment, a different type of image pick-up apparatus can be used so long as it can realize overall zooming by the electronic zoom function and the optical zoom function. Further, according to the present exemplary embodiment, a different type of image pick-up apparatus can be used so long as it can execute noise reduction processing by overwriting an audio signal in a period in which the noise is generated during the operation of the optical zoom with an estimated audio signal calculated based on an audio signal of a predetermined time before or after the optical zoom is operated.

According to the present exemplary embodiment, while the "optical zoom" function is operated, the optical image of the object obtained via the lens is enlarged at a fixed ratio, however, the image is not necessarily enlarged at a fixed ratio. In other words, if it is necessary to quickly increase the ratio of the "optical zoom" compared to the ratio of the "electronic zoom", it can be increased to the fastest possible speed. In this case also, the ratio of the "electronic zoom" is quickly lowered so that the overall zoom change, which is a total of the ratio of the "optical zoom" and the ratio of the "electronic zoom", is not rapidly increased by the speed of the "optical zoom".

Further, although a case where the image is enlarged as described according to the present exemplary embodiment, the present invention can be similarly applied to a case where the image is reduced. In that case, the image is reduced by combining the "optical zoom" and the "electronic zoom", and the "noise reduction processing" is executed in the period the "optical zoom" is operated.

Further, according to the present exemplary embodiment, although the zoom function is used in the description, a combination of the "optical image stabilization" and the "electronic image stabilization" can also be used. In other words, in order to prevent image blurring, an operation is performed so that a noise generation period due to the "optical image stabilization" is limited to 0.1 second or less, and the image blurring is prevented by the "electronic image stabilization" in the period the "optical image stabilization" is not used. Further, in addition to alternately operating the "optical image stabilization" and the "electronic image stabilization", the "noise reduction processing" can be executed when the "optical image stabilization" is used.

In other words, the present invention can be applied to any types of the image pick-up apparatus so long as it includes an optical image changing function capable of optically enlarging an image or preventing image blur and an electronic image changing function capable of electronically enlarging (using image processing) an image or preventing image blur. Further, according to the present exemplary embodiment, in such an image pick-up apparatus, an audio signal in a period the optical image changing is performed can be replaced with an "estimated audio signal" generated by using an audio signal before and/or after the audio signal, and the noise reduction processing is executed. Furthermore, according to the present exemplary embodiment, such an image pick-up apparatus stops the optical image change at the same time as executing the electronic image change, so that, while maintaining the apparent image change, the image pick-up apparatus can prevent an optical element such as a lens from moving in the period the "estimated audio signal" is generated and suppress noise contamination.

According to such an image pick-up apparatus, the noise associated with the movement of the optical element can be effectively reduced while the image change by zooming or image stabilization is continued.

According to the present exemplary embodiment, the "noise reduction processing" is performed by the audio processing unit 121 of the image pick-up apparatus 100. However, the function of the "noise reduction processing" is not necessarily included in the image pick-up apparatus 100 itself. In that case, the audio signal, the timing the lens control signal is output, and drive information indicating the noise generation period (lens drive period) are associated with one another and recorded in the recording medium 141. Then, a computer installing an application that can execute the "noise reduction processing" executes the "noise reduction processing" with respect to the audio signal reproduced from the recording medium 141.

In other words, the computer reads out the audio signal and the information indicating the noise generation period from the recording medium 141, generates an estimated audio signal from the audio signal before and/or after the noise generation period, and replaces the audio signal in the noise generation period with the estimated audio signal. Thus, the present invention is also achieved if the "noise reduction processing" according to the present exemplary embodiment is performed by an audio signal processing system which includes the image pick-up apparatus 100 as an audio acquisition apparatus and a computer as an audio signal processing apparatus.

As information indicating the noise generation period, for example, information such as 25.1 to 25.4 seconds from the start of the imaging can be generated and recorded in the recording medium 141. Further, information indicating that the timing the lens control signal is output is 25.1 seconds from the start of the imaging and the noise generation period is 0.3 second can be recorded in the recording medium 141. Further, information indicating the lens type, the drive unit, the drive amount (lens movement amount, diaphragm adjustment amount, etc.), and the timing the lens control signal is output can be recorded.

Further, if the communication unit 152 of the image pick-up apparatus 100 and a communication unit of the computer are data transferable by wired or wireless connection, the "noise reduction processing" can be executed by the computer and without using the recording medium 141. In such a case, the control unit 101 transmits to the communication unit 152 audio signals of a predetermined sample number from the audio signals stored in the buffer memory 207, and transmits the audio signals to the communication unit of the computer. Further, the control unit 101 transmits the timing the lens control signal is output and information indicating the noise generation period to the communication unit 152, and similarly transmits the timing and the information to the communication unit of the computer.

The computer executes the "noise reduction processing" according to processing of a certain application which is started on the computer and having a function same as the noise reduction unit 206 of the present exemplary embodiment by using the sound before or after the noise generation period similar to the present exemplary embodiment. On the premise of a system connected to the computer executable of the "noise reduction processing" of the present exemplary embodiment, if the drive of the drive unit or the record stop is limited in a particular period as is the case with the present exemplary embodiment, the aim of the present invention can be accomplished.

Further, although the image pick-up apparatus is used as an example of the audio signal processing apparatus in describing the present invention, other apparatuses are also applicable so long as they can process audio signals. For example, the present invention can be applied to apparatuses such as a video camera, an integrated circuit (IC) recorder, a cellular phone, a television, and an automobile.

The above-described exemplary embodiments illustrate examples and shall not be construed as limiting the present invention. The configuration and operation described in the above-described exemplary embodiments can be changed as needed.

According to the image pick-up apparatus 100 of the present exemplary embodiment, the noise generated in association with the operation of a drive unit related to image pick-up can be effectively reduced, and thus noise-reduced sound as well as natural video can be acquired.

Apparently, the present invention can be accomplished by supplying an apparatus with a storage medium in which a software program code which implements the functions of the above exemplary embodiments is stored. In this case, a computer (or CPU, MPU, and/or the like) including a control unit of the apparatus supplied with the storage medium reads out and executes the program code stored in the storage medium.

In this case, the program code itself read from the storage medium implements the functions of the above exemplary embodiments. Thus, the program code itself and the storage medium in which the program code is stored constitute the present invention.

For example, a flexible disk, a hard disk, an optical disk, a magneto-optical disk, a compact disc read-only memory (CD-ROM), a compact disc recordable (CD-R), a magnetic tape, a nonvolatile memory card, a ROM, or the like, can be used as the storage medium for supplying the program code.

In addition, apparently, the above case includes a case where a basic system or an operating system (OS) or the like which operates on the computer performs a part or all of processing based on instructions of the above program code and where the functions of the above exemplary embodiments are implemented by the processing.

Besides, the above case also includes a case where the program code read out from the storage medium is written to a memory provided on an expansion board inserted into a computer or to an expansion unit connected to the computer, so that the functions of the above exemplary embodiments are implemented. In this case, based on instructions of the program code, a CPU or the like provided in the expansion board or the expansion unit performs a part or all of actual processing.

Aspects of the present invention can also be realized by a computer of a system or apparatus (or devices such as a CPU, an MPU, or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-268746 filed Dec. 1, 2010, which is hereby incorporated by reference herein in its entirety.

What is claimed is:

1. An image pick-up and audio signal processing apparatus comprising:
    an image pick-up unit;
    a driving unit that drives an optical unit to change a size of an image to be obtained by the image pick-up unit;
    a changing unit that performs a process for changing a size of an image which is obtained from the image pick-up unit;
    a central processing unit (CPU) that (a) controls the changing unit to change a size of an image which is obtained from the image pick-up unit without driving the optical unit until a first period elapses since an instruction for starting changing a size of an image is input, (b) controls the driving unit to change a size of an image to be obtained by the image pick-up unit until a second period elapses since the first period elapses, and (c) controls the changing unit to change a size of an image which is obtained from the image pick-up unit without driving the optical unit until a third period elapses since the second period elapses;
    an audio obtain unit that (d) obtains first audio data until the first period elapses since the instruction is input, (e) obtains second audio data until the second period elapses since the first period elapses, and (f) obtains third audio data until the third period elapses since the second period elapses; and
    an audio processing unit that performs a process for reducing a noise included in the second audio data by using at least one of the first audio data and the third audio data,
    wherein, until an instruction for finishing changing a size of an image is input, the CPU controls at least one of the changing unit and the driving unit so that a size of an image to be changed by the changing unit and the optical unit becomes constant.

2. The image pick-up and audio signal processing apparatus according to claim 1, wherein the optical unit includes at least one of a zoom lens, a focus lens, an image stabilizing lens, and a diaphragm.

3. The image pick-up and audio signal processing apparatus according to claim 1, wherein, until an instruction for finishing changing a size of an image is input, the CPU controls the changing unit to change a size of an image which is obtained from the image pick-up unit.

4. A method for controlling an image pick-up and audio signal processing apparatus, wherein the image pick-up and audio signal processing apparatus includes an image pick-up unit, a driving unit that drives an optical unit to change a size of an image to be obtained by the image pick-up unit, and a changing unit that performs a process for changing a size of an image which is obtained from the image pick-up unit, the method comprising:
- controlling the changing unit to change a size of an image which is obtained from the image pick-up unit without driving the optical unit until a first period elapses since an instruction for starting changing a size of an image is input;
- obtaining first audio data until the first period elapses since the instruction is input;
- controlling the driving unit to change a size of an image to be obtained by the image pick-up unit until a second period elapses since the first period elapses;
- obtaining second audio data until the second period elapses since the first period elapses;
- controlling the changing unit to change a size of an image which is obtained from the image pick-up unit without driving the optical unit until a third period elapses since the second period elapses;
- obtaining third audio data until the third period elapses since the second period elapses;
- performing a process for reducing a noise included in the second audio data by using at least one of the first audio data and the third audio data; and
- controlling at least one of the changing unit and the driving unit so that a size of an image to be changed by the changing unit and the optical unit becomes a constant, until an instruction for finishing changing a size of an image is input.

5. The method according to claim 4, wherein the optical unit includes at least one of a zoom lens, a focus lens, an image stabilizing lens, and a diaphragm.

6. The method according to claim 4, further comprising controlling the changing unit to change a size of an image which is obtained from the image pick-up unit, until an instruction for finishing changing a size of an image is input.

* * * * *